(12) United States Patent
Jain et al.

(10) Patent No.: US 12,307,196 B2
(45) Date of Patent: *May 20, 2025

(54) SYSTEMS AND METHODS FOR CONTENT CREATION BASED ON AUDIENCE PREFERENCE AND CONTEXTUAL FACTORS

(71) Applicant: Prezent Inc., Los Altos, CA (US)

(72) Inventors: Amod Jain, Noida (IN); Rajat Mishra, Los Altos, CA (US); Shreos Roychowdhury, Bangalore (IN)

(73) Assignee: Prezent Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,370

(22) Filed: Aug. 25, 2023

(65) Prior Publication Data

US 2024/0061994 A1    Feb. 22, 2024

Related U.S. Application Data

(63) Continuation of application No. 18/156,649, filed on Jan. 19, 2023, now Pat. No. 11,775,748.

(60) Provisional application No. 63/339,827, filed on May 9, 2022.

(51) Int. Cl.
*G06F 40/126* (2020.01)
*G06F 40/103* (2020.01)
*G06F 40/186* (2020.01)
*G06Q 10/101* (2023.01)

(52) U.S. Cl.
CPC .......... *G06F 40/186* (2020.01); *G06F 40/103* (2020.01); *G06Q 10/101* (2013.01)

(58) Field of Classification Search
CPC .... G06F 40/186; G06F 40/103; G06Q 10/101
See application file for complete search history.

(56) References Cited

U.S. PATENT DOCUMENTS

| | | | | |
|---|---|---|---|---|
| 7,296,027 B2* | 11/2007 | Cobb | ................... | G06F 40/186 |
| | | | | 704/7 |
| 10,437,925 B2* | 10/2019 | Sebastian | ................ | A63F 13/63 |
| 10,733,371 B1* | 8/2020 | Baloga | ................. | G06Q 10/101 |
| 2005/0188323 A1* | 8/2005 | Shibata | ................ | G06F 40/186 |
| | | | | 715/760 |
| 2005/0216431 A1* | 9/2005 | Baker | ................... | G06F 40/186 |

(Continued)

FOREIGN PATENT DOCUMENTS

| | | | | |
|---|---|---|---|---|
| CN | 1744026 A | * | 3/2006 | ........... G06F 17/248 |
| CN | 113268971 A | * | 8/2021 | ............ G06F 16/35 |

(Continued)

OTHER PUBLICATIONS

International Search Report and Written Opinion for PCT/US2023/021559 dated Jul. 26, 2023, 12 pages.

*Primary Examiner* — Hassan Mrabi
(74) *Attorney, Agent, or Firm* — Goodwin Procter LLP

(57) ABSTRACT

A method for creating a template for content including receiving at least one audience parameter representing at least one preference of a target audience when receiving the content, receiving at least one context parameter representing a context of the content, determining a content storyline based on the at least one audience parameter and the at least one context parameter, and generating a content template based on the content storyline.

42 Claims, 16 Drawing Sheets

(56) References Cited

U.S. PATENT DOCUMENTS

| | | | |
|---|---|---|---|
| 2005/0257127 A1* | 11/2005 | Tanaka | G06Q 30/0241 |
| | | | 715/277 |
| 2006/0048063 A1* | 3/2006 | Stackowicz | G06Q 30/0241 |
| | | | 715/764 |
| 2008/0040340 A1* | 2/2008 | Varadarajan | G06F 40/186 |
| | | | 707/999.005 |
| 2008/0155387 A1* | 6/2008 | Yabe | G06F 40/103 |
| | | | 715/204 |
| 2008/0189603 A1* | 8/2008 | Kikuchi | G06F 40/186 |
| | | | 715/243 |
| 2011/0261994 A1* | 10/2011 | Cok | G06F 40/186 |
| | | | 382/100 |
| 2013/0262092 A1* | 10/2013 | Wasick | G06F 40/40 |
| | | | 704/9 |
| 2016/0110899 A1* | 4/2016 | Kalb | G06Q 30/0241 |
| | | | 715/202 |
| 2018/0196784 A1 | 7/2018 | Kumar et al. | |
| 2021/0133393 A1* | 5/2021 | Sieling | G06F 40/106 |
| 2022/0180050 A1* | 6/2022 | Rabines | G06Q 10/10 |

FOREIGN PATENT DOCUMENTS

| | | | | |
|---|---|---|---|---|
| EP | 3014862 A1 | 5/2016 | | |
| WO | WO-2005116864 A1 * | 12/2005 | | G06F 17/248 |

* cited by examiner

Let's start with a few questions to build your Presentation Fingerprint

Visual Preference 　　Story Choice 　　Data Style

We will use this information to tailor presentation content.

[ Discover My Fingerprint ] ~312

Estimated Time: 1 - 2 minutes
Don't worry. You can change your answers later!

My Fingerprint

< Back

**When others present to you,
what are some of your top preferences they should know?** — 352

We will share this information with your colleagues,
so they can build presentations that you will love!

Select from Common Preferences

- Start with an Executive Summary
- Label all charts
- State objective upfront
- All text > 14 pt font
- Send deck a day in advance
- Action-oriented titles
- $M instead of $mm
- 3 minutes per slide
- Pause for questions
- Leave 50% time for questions
- Footnotes matter
- No animations, please
- + Write your own — 356

SYSTEMS AND METHODS FOR CONTENT CREATION BASED ON AUDIENCE PREFERENCE AND CONTEXTUAL FACTORS

CROSS-REFERENCE TO RELATED APPLICATIONS

This application is a continuation of U.S. patent application Ser. No. 18/156,649 titled "SYSTEMS AND METHODS FOR CONTENT CREATION BASED ON AUDIENCE PREFERENCE AND CONTEXTUAL FACTORS" and filed on Jan. 19, 2023, which claims priority to and the benefit of U.S. Provisional Patent Application No. 63/339,827, titled "SYSTEMS AND METHODS FOR CONTENT CREATION BASED ON AUDIENCE PREFERENCE AND CONTEXTUAL FACTORS" and filed on May 9, 2022, the entire contents of each of which are hereby incorporated by reference herein.

TECHNICAL FIELD

This specification relates to content creation and, in particular, to content creation based on audience preferences and contextual factors.

BACKGROUND

Business professionals often create content to communicate information with a target audience. For example, such professionals may give a presentation to an audience to pitch an idea, report findings, or provide knowledge on particular topics. However, these presentations take hours to construct and refine, and can be manually laborious to put together. In many cases, professionals and their teams find it difficult to standardize content, distribute presentations, and establish a common language. In addition, presentations or content are often developed based on the presenter's preferences, rather than the audience's preferences.

SUMMARY

At least one aspect of the present disclosure is directed to a method for creating a template for content. The method includes receiving at least one audience parameter representing at least one preference of a target audience when receiving the content, receiving at least one context parameter representing a context of the content; determining a content storyline based on the at least one audience parameter and the at least one context parameter, and generating a content template based on the content storyline.

In one embodiment, the target audience is a single individual. In some embodiments, the target audience is two or more individuals. In various embodiments, the at least one audience parameter represents one or more of image preferences, color preferences, illustration preferences, presentation preferences for logical arguments, presentation preferences for data, and preferences for visualizing data of the target audience. In certain embodiments, the method includes presenting at least one preference inquiry to the target audience, deriving, based on a response to the at least one preference injury, the at least one preference of the target audience when receiving the content, and generating at least one preference fingerprint for the target audience based on the at least one preference of the target audience.

In some embodiments, the at least one preference fingerprint includes the at least one audience parameter. In one embodiment, the at least one context parameter corresponds to one or more of a type, purpose, and objective of the content. In certain embodiments, the content storyline corresponds to one or more of a sequence, order, and flow of the content. In various embodiments, the method includes selecting a style profile based on the at least one audience parameter and the at least one context parameter.

In one embodiment, generating the content template includes generating the content template based on the content storyline and the style profile. In some embodiments, the style profile corresponds to one or more of a content theme, a font theme, a color theme, and an organizational theme of the content. In various embodiments, the content is a presentation and the content template corresponds to a slide deck for the presentation. In certain embodiments, the method includes exporting the content template to at least one content editing application.

Another aspect of the present disclosure is directed to a system for creating a template for content. The system includes at least one memory for storing computer-executable instructions and at least one processor for executing the instructions stored on the memory. Execution of the instructions programs the at least one processor to perform operations that include receiving at least one audience parameter representing at least one preference of a target audience when receiving the content, receiving at least one context parameter representing a context of the content, determining a content storyline based on the at least one audience parameter and the at least one context parameter, and generating a content template based on the content storyline.

In one embodiment, the target audience is a single individual. In some embodiments, the target audience is two or more individuals. In various embodiments, the at least one audience parameter represents one or more of image preferences, color preferences, illustration preferences, presentation preferences for logical arguments, presentation preferences for data, and preferences for visualizing data of the target audience. In certain embodiments, execution of the instructions programs the at least one processor to perform operations that include presenting at least one preference inquiry to the target audience, deriving, based on a response to the at least one preference injury, the at least one preference of the target audience when receiving the content, and generating at least one preference fingerprint for the target audience based on the at least one preference of the target audience.

In some embodiments, the at least one preference fingerprint includes the at least one audience parameter. In one embodiment, the at least one context parameter corresponds to one or more of a type, purpose, and objective of the content. In certain embodiments, the content storyline corresponds to one or more of a sequence, order, and flow of the content. In various embodiments, execution of the instructions programs the at least one processor to perform operations that include selecting a style profile based on the at least one audience parameter and the at least one context parameter.

In one embodiment, generating the content template includes generating the content template based on the content storyline and the style profile. In some embodiments, the style profile corresponds to one or more of a content theme, a font theme, a color theme, and an organizational theme of the content. In various embodiments, the content is a presentation and the content template corresponds to a slide deck for the presentation. In certain embodiments, execution of the instructions programs the at least one processor to perform operations that include exporting the content template to at least one content editing application.

BRIEF DESCRIPTION OF THE DRAWINGS

FIGS. 3A-3F illustrate a user interface of a client application used to create a user fingerprint in accordance with aspects described;

FIG. 9 illustrates a slide library in accordance with aspects described;

DETAILED DESCRIPTION

As described above, business professionals often create content to communicate information with a target audience. For example, such professionals may give a presentation to an audience to pitch an idea, report findings, or provide knowledge on particular topics. However, these presentations take hours to construct and refine, and can be manually laborious to put together. In many cases, professionals and their teams find it difficult to standardize content, distribute presentations, and establish a common language. In addition, presentations or content are often developed based on the presenter's preferences, rather than the audience's preferences.

As such, systems and methods for creating content templates based on audience preferences and contextual factors are provided herein. In at least one embodiment, a content storyline is generated based on parameters of the target audience and the context of the content. In one example, the parameters of the target audience correspond to a preference fingerprint of the audience member(s). In some examples, a style profile is selected or created for the content template based on the parameters of the target audience, the context of the content, and the storyline.

Figure 1:
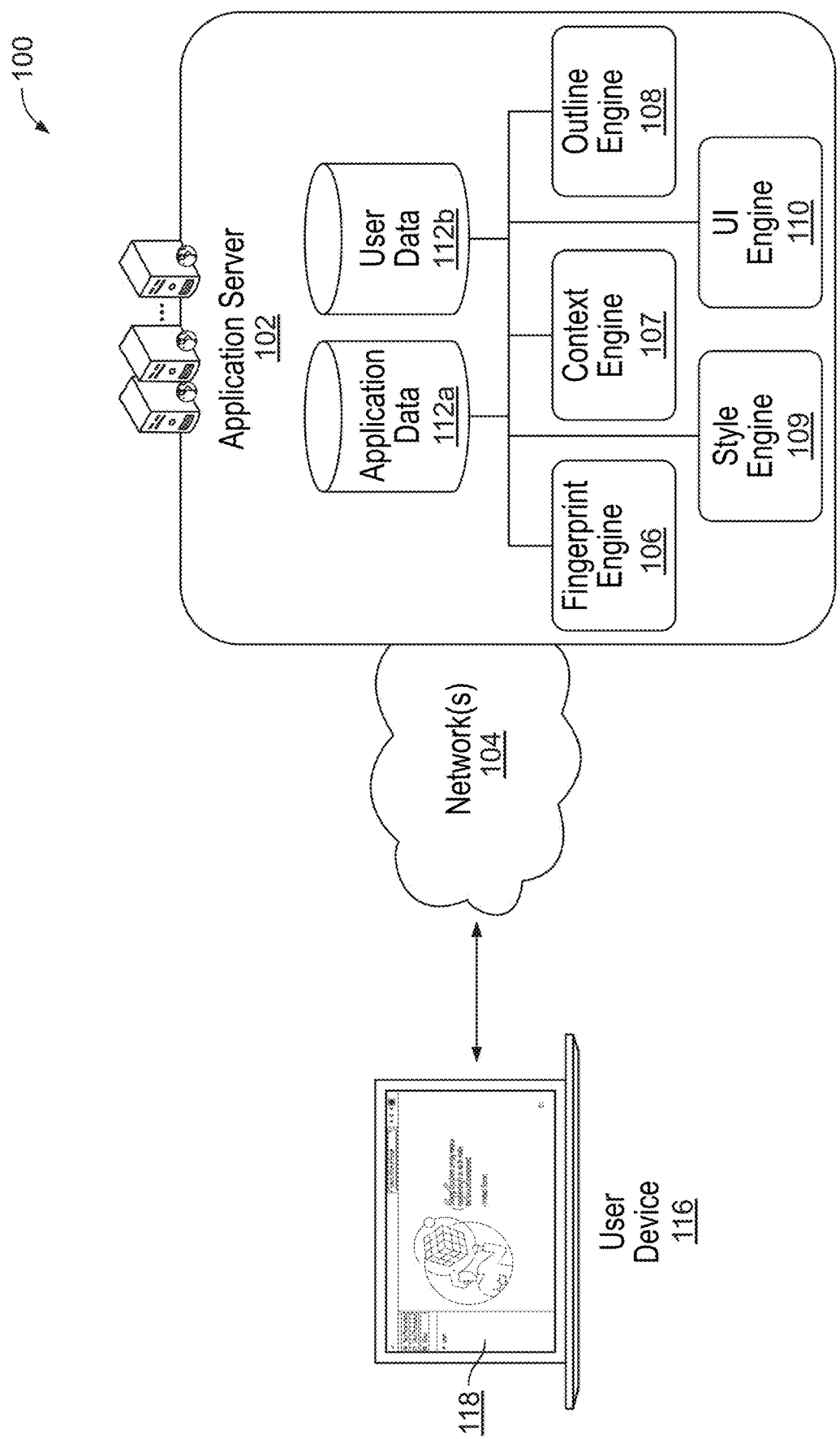
FIG. 1 illustrates a block diagram of a system for creating content templates in accordance with aspects described herein.

FIG. 1 is a block diagram of a system 100 for creating content templates in accordance with aspects described herein. In one example, the system 100 is implemented by an application server 102. The application server 102 provides functionality for creating and providing one or more content templates. The application server 102 comprises software components and databases that can be deployed at one or more data centers (not shown) in one or more geographic locations, for example. The application server 102 software components may include a fingerprint engine 106, a context engine 107, an outline engine 108, a style engine 109, and a user interface (UI) engine 110. The software components can comprise subcomponents that can execute on the same or on a different individual data processing apparatus. The application server 102 databases may include an application database 112a and a user database 112b. The databases can reside in one or more physical storage systems. Example features of the software components and data processing apparatus will be further described below.

The application server 102 is configured to send and receive data to and from users' client devices (e.g., user device 116) through one or more data communication networks 104 such as the Internet, for example. The user can access a user interface of a client application 118. In some examples, the client application 118 is configured to run in a web browser or a special-purpose software application executing on the user device 116.

Although this application will describe many functions as being performed by application server 102, in various implementations, some or all functions performed by application server 102 may be performed locally by a client application (e.g., client application 118). The client application 118 can communicate with the application server 102 over the network(s) 104 using Hypertext Transfer Protocol (HTTP), another standard protocol, or a proprietary protocol, for example. The user device 116 can be a mobile phone, a smart watch, a tablet computer, a personal computer, or a game console. Other types of user devices are possible.

In various implementations, the system 100 can enable the creation of content templates associated with different types of content. In one example, the fingerprint engine 106 of the application server 102 is configured to generate a fingerprint for each user. The fingerprint of each user represents the preferences of the user when receiving or viewing content. In other words, the fingerprint represents the preferences of the user when the user is the target audience (or included in the target audience) for content. In some examples, the fingerprint engine 106 is configured to collect data from the user (e.g., via the client application 118) to generate the fingerprint. The fingerprint engine 106 may store the fingerprint of each user in the user database 112b.

The context engine 107 is configured to manage the context of the content template and the corresponding content. In one example, the context engine 107 collects information from the user(s) creating the content template (e.g., via the client application 118) to determine the context of the content. In some examples, the context includes a type, purpose, and/or objective of the content. For example, if the content is a presentation, the context may represent the type or tone of the presentation. In some examples, the application database 112a includes a library of context information that is accessed by the context engine 107. The context engine 107 may be configured to store the context information for the content template in the application database 112a.

The outline engine 108 is configured to generate an outline (or storyline) for the content template. The outline may correspond to sequence, order, and/or flow of the content template. For example, if the content is a presentation, the outline may represent the type, number, and/or order of slides in a slideshow. In some examples, the application database 112a includes an outline library (e.g., a slide library) that is accessed by the outline engine 108. The outline engine 108 may be configured to store the outline (or storyline) for the content template in the application database 112a.

The style engine 109 is configured to generate a style profile for the content template. In one example, the style profile incudes one or more stylistic attributes of the content template and/or the content. For example, the style profile may include one or more of a template theme, a font theme, a color theme, and an organizational theme. In some examples, the template theme represents the stylistic preferences (e.g., graphics, logos, etc.) of a company or organization associated with the target audience of the content. The font theme may represent one or more font attributes (e.g., type, size, color, etc.) included in the content template and/or to be used for the generation of the content in a content editing tool. The color theme may represent one or more colors (or color schemes) included in the content template and/or to be used for the generation of the content. The organizational theme may represent one or more approaches or techniques for presenting information (e.g., data, ideas, concepts, plans, etc.) included in the content template and/or to be used for the generation of the content.

In one example, the style profile selected or created by the style engine 109 includes a work area for the content template. The work area may correspond to a region or area of a presentation slide where the content is located. In some examples, the location and/or size of the work area may be determined by the style profile. The style profile may also include a node count that is used to create various diagrams included in the content template (or the content). For example, the node count may the define the number of nodes (e.g., boxes) included in a flow chart or flow diagram.

In some examples, the application database 112a includes a library of stylistic resources (e.g., fonts, colors, graphics, charts, tables, etc.) that is accessed by the style engine 109 to generate the style profile. In some examples, the style engine 109 may receive an uploaded presentation and extract various stylistic attributes. For example, a presentation associated with a particular company or organization may be provided to the style engine 109 to generate a corresponding style profile. In some examples, the style engine 109 may analyze the uploaded presentation and create (of find) a style profile that matches the stylistic attributes of the company or organization. In some examples, the style engine 109 may analyze XML data associated with the uploaded presentation to identify the corresponding stylistic attributes. The style engine 109 may be configured to store each style profile in the application database 112a.

In one example, the UI engine 110 is configured to manage the UI of the client application 118. For example, the UI engine 110 may collect or gather information from users (e.g., content template creators) via the client application 118. In some examples, the UI engine 110 provides the collected information to the engines 106-109 and/or stores the collected information in the databases 112a, 112b. Likewise, the UI engine 110 may provide and present information from the engines 106-109 or the databases 112a, 112b to users via the client application 118. In some examples, the UI engine 110 provides an export service that allows the content template to be exported in various formats (e.g., PDF, Microsoft Word, Microsoft PowerPoint, etc.). In some examples, the UI engine 102 is configured to provide additional services such as user login, user account setup, user account management, etc.

Figure 2:
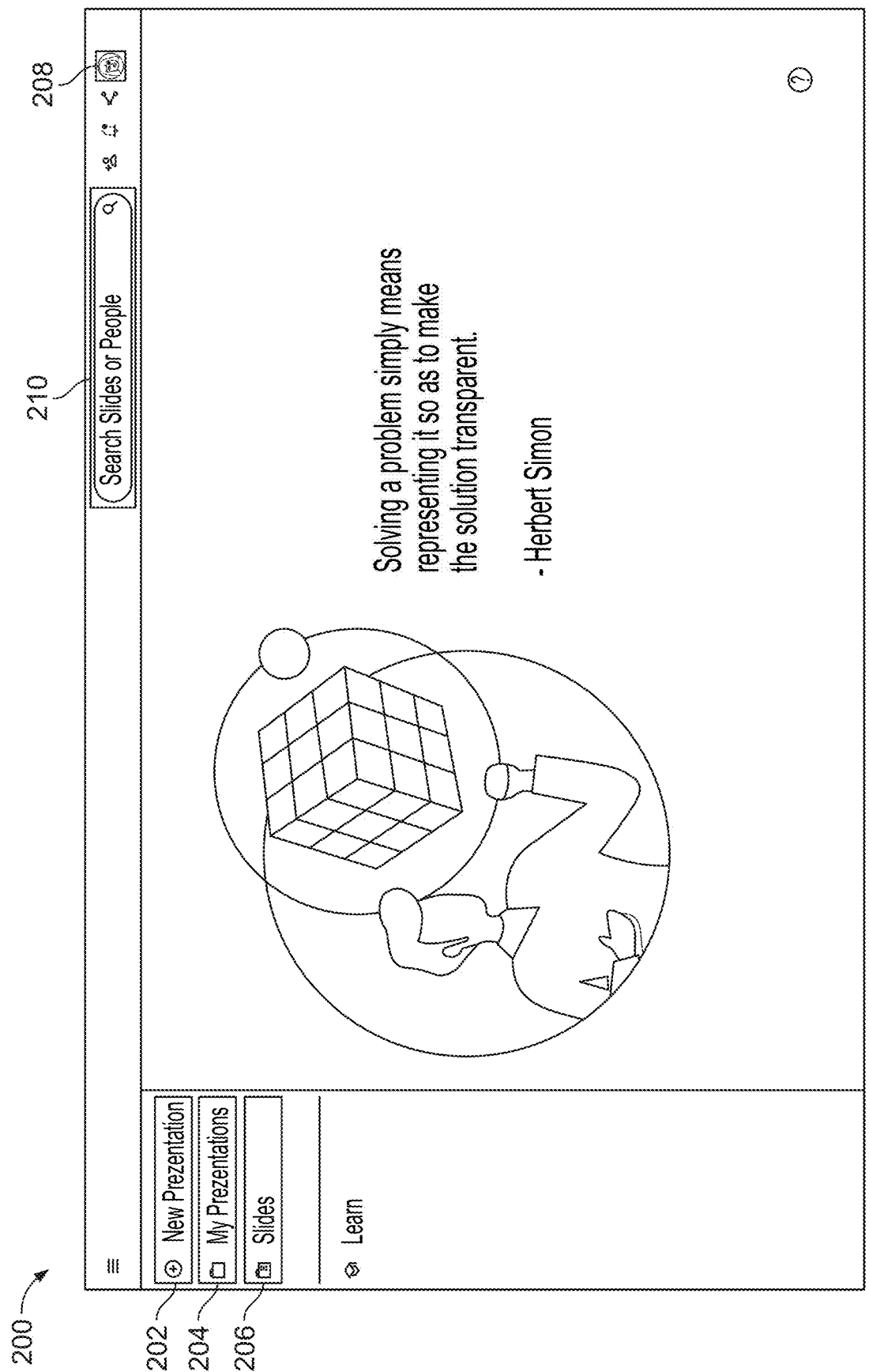
FIG. 2 illustrates a user interface of a client application in accordance with aspects described.

FIG. 2 is an example view 200 of the client application 118 in accordance with aspects described herein. In one example, the view 200 corresponds to a home screen of the client application 118. FIG. 2 and other figures presenting user interfaces in this application include icons and labels and refer to various features displayed by the user interface (e.g., search, account, notifications, etc.). While such icons and labels will be used to reference and describe such features in this application, the features may be presented with different icons and labels as well.

As shown, the client application 118 includes a new presentation button 202 that enables the user (e.g., content template creator) to create a new presentation template. In one example, the client application 118 includes a presentation button 204 that allows the user to view previously created templates. The client application 118 may include a slides button 206 that allows the user to view, download, and/or a modify a plurality of presentation slides (e.g., in a slide library of application database 112a). In one example, the client application 118 includes a user button 208 that enables the user to manage a user account and/or various settings associated with the system 100. In some examples, the client application 118 includes a search bar 210 that provides a search function enabling the user to search for specific slides (e.g., from the slide library) and/or specific users (e.g., potential audience members).

After creating a user account, the user may be prompted by the client application 118 to generate a fingerprint. In other examples, the user may initiate the fingerprint process via the user button 208 to create a new fingerprint or modify/update an existing fingerprint. In some examples, the user can generate a fingerprint for someone other than themselves (e.g., a member of the same company as the user, a friend of the user, etc.).

Figure 3A:
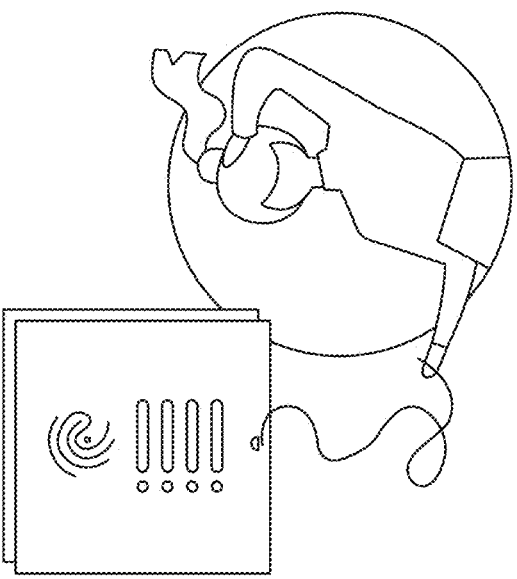
Figure 3A:
Figure 3A:
Figure 3A:

FIG. 3A is an example view 300 of the client application 118 in accordance with aspects described herein. In one example, the view 300 corresponds to the start of the fingerprint generation process. In some examples, the fingerprint generation process is configured to determine the visual preferences, the story choice (e.g., storyline) preferences, and the data style preferences of the user when viewing or receiving content. The user may select the "Discover My Fingerprint" button 312 to start the fingerprint generation process.

Figure 3B:
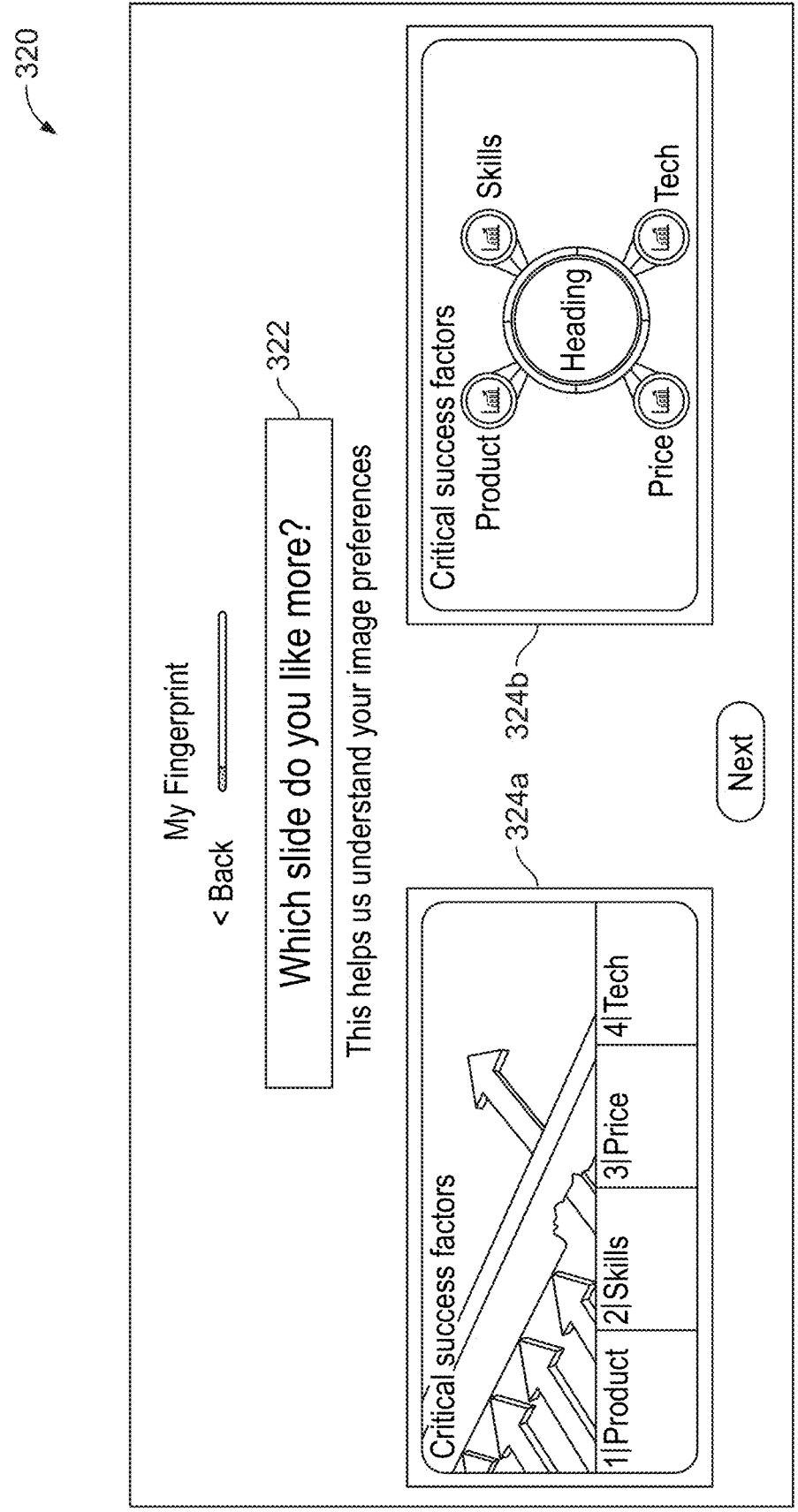

In some examples, the fingerprint generation process includes presenting a plurality of questions (or inquires) to the user. For example, FIG. 3B illustrates a view 320 of the client application 118 for determining the image preferences of the user. The view 320 includes a first question 322 (e.g., "Which slide do you like more") that is presented to the user. In some examples, an explanation is provided with the first question 322 to provide context to the user (e.g., "This helps us understand your image preferences"). At least two options are presented to the user for selection in response to the first question 322. In some examples, the user can select one option; however, in other examples, the user may select more than one option. In the illustrated example, a first option 324a and a second option 324b are presented to the user for selection. In one example, the options 324a, 324b correspond to example presentation slides. In some examples, the user may select an option by clicking (or tapping) on the option directly. Alternatively, the user may select an option by selecting a button or other UI element.

Figure 3C:
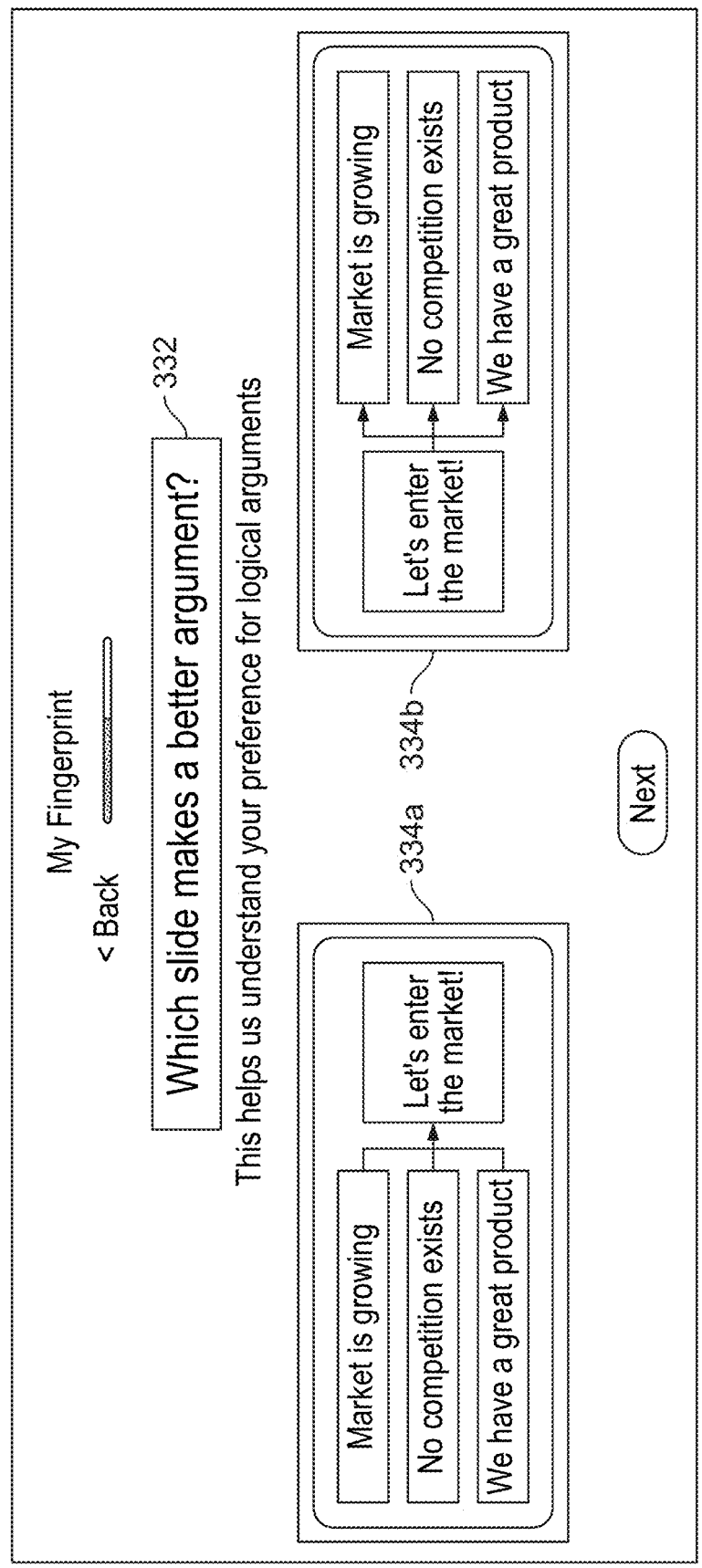

The fingerprint generation process may continue by presenting additional questions (or inquires) to the user. For example, FIG. 3C illustrates a view 330 of the client application 118 for determining the presentation preferences of the user for logical arguments. The view 330 includes a second question 332 (e.g., "Which slide makes a better argument?") that is presented to the user. In some examples, an explanation is provided with the second question 332 to provide context to the user (e.g., "This helps us understand your preference for logical arguments"). At least two options are presented to the user for selection in response to the second question 332. In some examples, the user can select one option; however, in other examples, the user may select more than one option. In the illustrated example, a first option 334a and a second option 334b are presented to the user for selection.

Figure 3D:
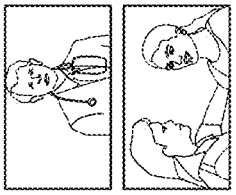
Figure 3D:
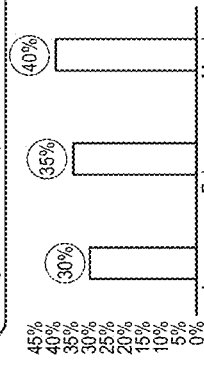

Similarly, FIG. 3D illustrates a view 340 of the client application 118 for determining the data presentation preferences of the user. The view 340 includes a third question 342 (e.g., "Which slide is more convincing to you?") that is presented to the user. In some examples, an explanation is provided with the third question 342 to provide context to the user (e.g., "This choice helps us learn your data preferences"). At least two options are presented to the user for selection in response to the third question 342. In some examples, the user can select one option; however, in other examples, the user may select more than one option. In the illustrated example, a first option 344a and a second option 344b are presented to the user for selection.

FIG. 3E illustrates a view 350 of the client application 118 for determining the top (or most important) preferences of the user. The view 350 includes a fourth question 352 (e.g., "When others present to you, what are some of your top preferences they should know?") that is presented to the user. In some examples, an explanation is provided with the fourth question 352 to provide context to the user (e.g., "We will share this information with your colleagues, so they can build presentations that you will love!"). A plurality of preference options 354 are presented to the user for selection in response to the third question 352. In one example, the preference options 354 represent "pet peeves" of the user. In some examples, the options included in the plurality of preference options 354 correspond to the top (or most popular) options of all users (or a subset of users) across the platform. For example, the fingerprint engine 106 may be configured to monitor and analyze the top preferences of users across the platform to derive the plurality of preference options 354. In some examples, the user can select one or more of the options 354. In some examples, the user can select option 356 to provide (e.g., write or type) their own specific preference(s).

While four example questions 322, 332, 342, and 352 are described above, it should be appreciated that the fingerprint generation process can include any number of questions or inquires. For example, the fingerprint generation process may include questions directed to image preferences, color preferences, illustration preferences, logical arguments preferences, data preferences, data visualization preferences, or any other type of relevant preferences of the user. In some examples, the various options (e.g., 324a, 324b, etc.) can be presented to the user with minimal context (e.g., "Which slide do you like more?"). In some examples, the questions and/or corresponding options may be presented in a different format (e.g., text only, video, etc.). In addition, more than two options can be presented with each question.

Once all questions (or inquires) have been presented, the fingerprint engine 106 is configured to generate a fingerprint for the user based on the user's selections (or inputs). In some examples, the fingerprint engine 106 uses one or more algorithms to generate the fingerprint. In some examples, the fingerprint engine 106 uses one or more lookup tables to generate the fingerprint (e.g., stored in the application database 112b). In some examples, the fingerprint engine 106 includes a machine learning model to generate the fingerprint. In general, any suitable machine learning technique can be used, such as, for example: a gradient boosted random forest, a regression, a neural network, a decision tree, a support vector machine, a Bayesian network, other type of technique.

Figure 3F:
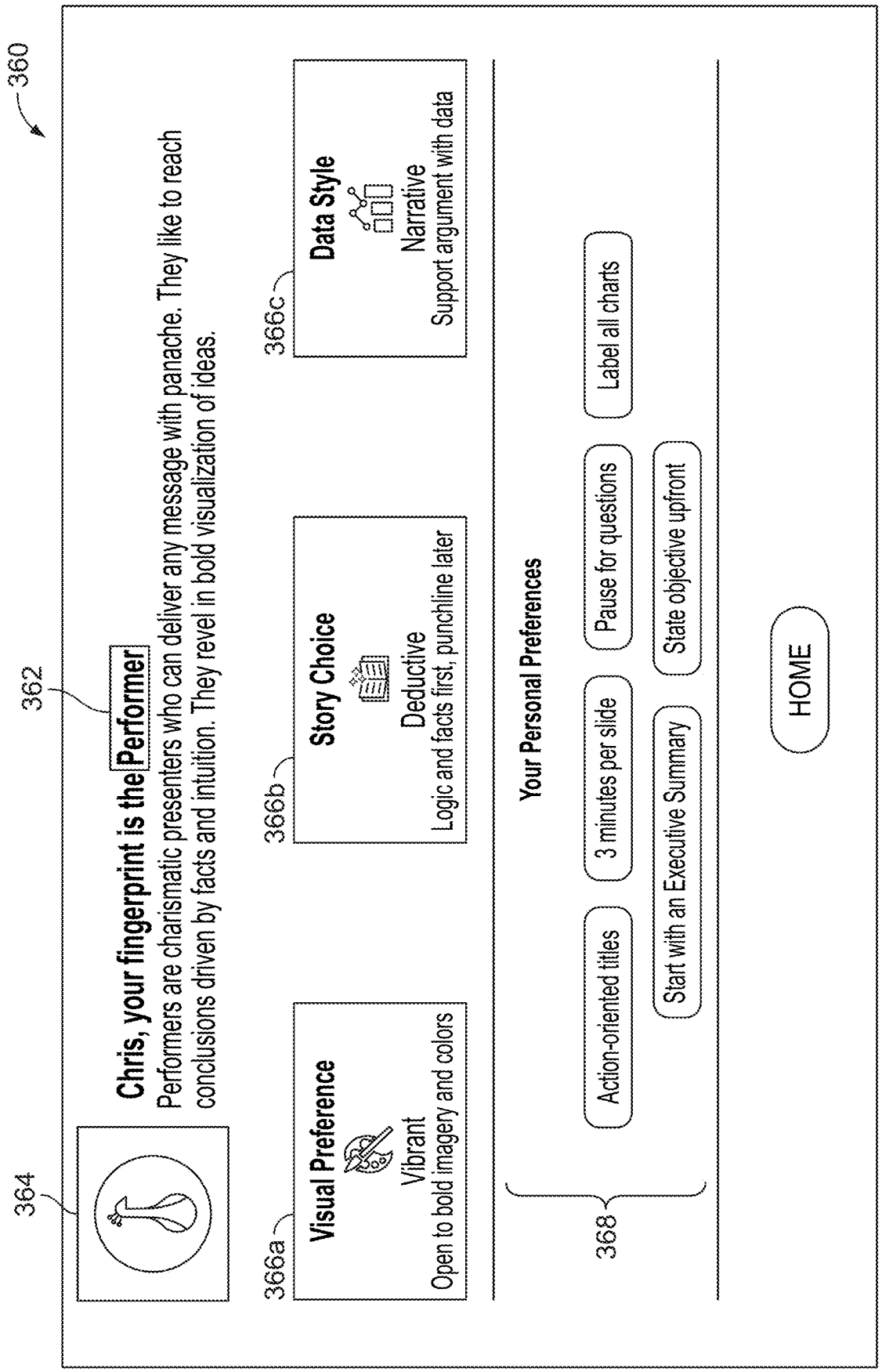

In one example, the fingerprint represents the visual preferences, story choice (e.g., storyline) preferences, data style preferences, and other personal preferences of the user. In some examples, the fingerprint may indicate one or more characteristics of the user. For example, FIG. 3F illustrates a view 360 of the client application 118 corresponding to a user fingerprint. In one example, the fingerprint is classified with a fingerprint type 362 (e.g., "Performer"). The fingerprint type 362 may be selected by the fingerprint engine 106 from a plurality of fingerprint types, such as, for example: architect, director, navigator, performer, producer, scholar, scientist, and surgeon. In some examples, the fingerprint type 362 has a corresponding symbol 364. In some examples, the fingerprint type 362 is selected based on one or more fingerprint attributes 366. In the illustrated example, the user has a visual preference attribute 366a of "Vibrant" that is described as being "open to bold imagery and colors", a story choice attribute 366b of "Deductive" that is described as "logic and facts first, punchline later", and a data style attribute 366c of "Narrative" that is described as "support argument with data." In some examples, the fingerprint includes personal preferences 368 of the user. For example, the personal preferences 368 may correspond to the user's selections from the plurality of preference options 354 and/or user provided preferences. In some examples, the fingerprint for each user is stored in the user database 112b.

In some examples, the fingerprint engine 106 can process and analyze existing content (e.g., a slideshow presentation) to derive a fingerprint. For example, a user may upload an example presentation via the client application 118. The fingerprint engine 106 can analyze the presentation to extract the visual preferences, story choice preferences, data style preferences, and other personal preferences of the user. In such examples, the fingerprint engine 106 may include a topic model (e.g., a Latent Dirichlet allocation (LDA) model) to process and analyze the user-provided content. In some examples, the fingerprint engine 109 may be configured to process and analyze XML data associated with the user-provided content.

Figure 4:
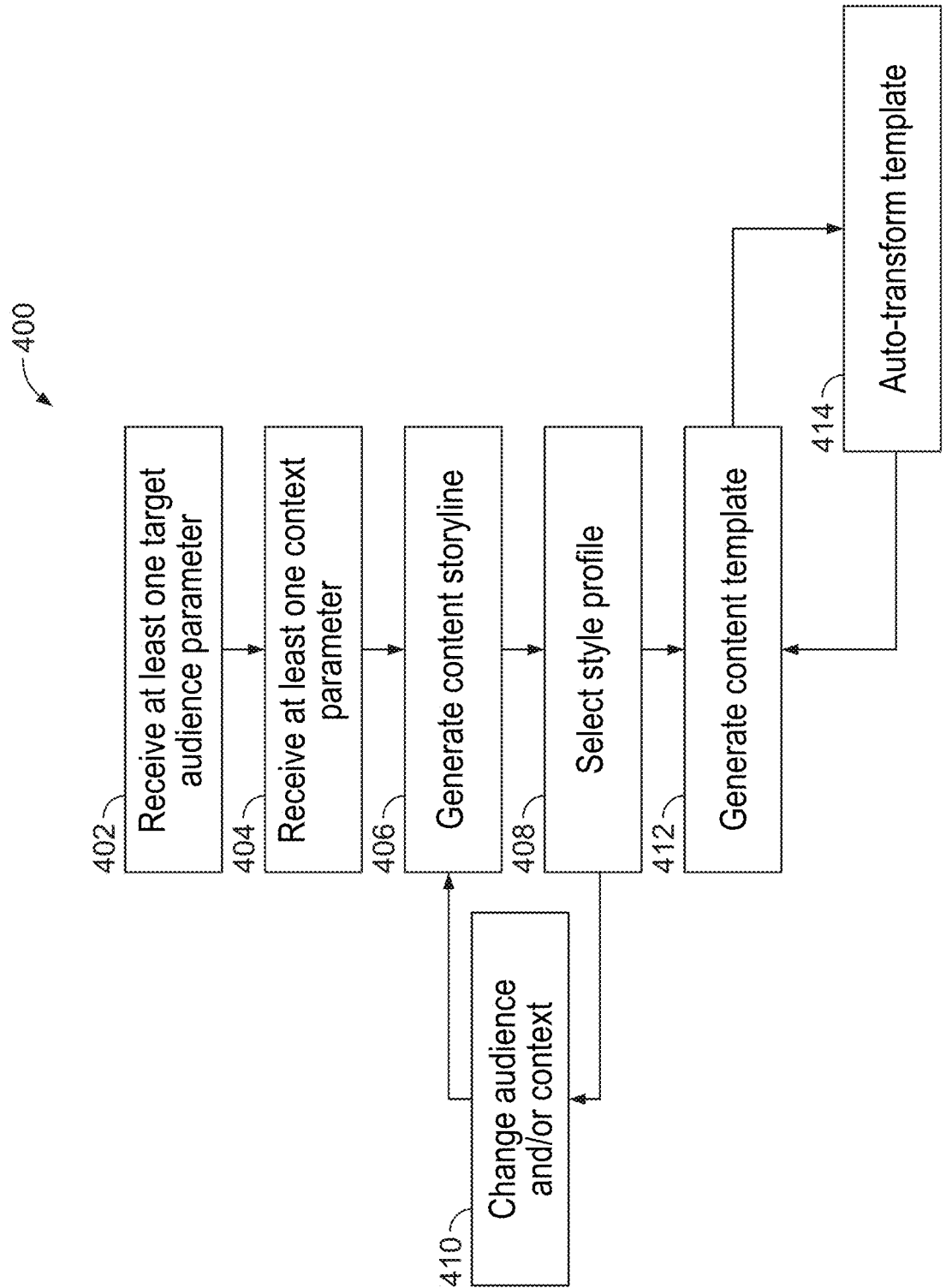
FIG. 4 illustrates a flow diagram of a method for creating a content template.

In one example, the system 100 uses the user-specific fingerprints to create content templates that are tailored to the target audience. FIG. 4 is a flow diagram of a method 400 for creating a content template in accordance with aspects described herein. In some examples, the method 400 corresponds to a process carried out by the application server 102 and the client application 118.

At step 402, the fingerprint engine 106 receives at least one target audience parameter. In this context, the "target audience" corresponds to the intended or expected audience that the content template is being used to deliver content to. In one example, the at least one target audience parameter includes the names of members in the target audience. In some examples, the at least one target audience parameter includes the name of a group, team, club, organization, company, or another type of group including one or more individuals. In some examples, the at least one target audience parameter includes at least one fingerprint type (e.g., Architect, Surgeon, etc.). In some examples the fingerprint engine 106 is configured to access, retrieve, or download the corresponding user fingerprints from the application database 112a.

Figure 5:
FIG. 5 illustrates a user interface of a client application in accordance with aspects described.

In one example, the target audience parameters are provided to the fingerprint engine 106 from the client application 118. The client application 118 may be configured to collect the various parameters from the user(s) creating the content template. For example, FIG. 5 illustrates a view 500 of the client application 118 for collecting template information from the user. In one example, a text entry box is provided enabling the user to enter a title 502 for the content template (or the content). The client application 118 may provide the title 502 to the fingerprint engine 106 or another engine of the application server 102 (e.g., the context engine 107).

In some examples, a search function is provided such that the user can add one or more audience members 504 to the target audience. In other examples, a drop down menu or other UI element may be provided for the user to add audience members. In some examples, the user can add individuals who are users of the platform (e.g., have a fingerprint). In some examples, the user can add individuals who are not members of the platform (e.g., do not have a fingerprint). The user may be prompted to provide contact information (e.g., an email address) for each non-member such that an invite or fingerprint inquiry can be sent. In some examples, the client application 118 is configured to provide the one or more audience members 504 to the fingerprint engine 106 as the at least one audience parameter.

At step 404, the context engine 107 receives at least one context parameter. In one example, "context" corresponds to the intended type, purpose, and/or objective of the content that the content template is being created for. In some examples, the "context" of the content corresponds to the tone of the content (e.g., good news, bad news, etc.). In one example, the at least one context parameter includes a content type. For example, if the content is a presentation, the content type may be one of: all-hands meeting, board of directors meeting, brand performance review, brand plan, budget overview, business case, business plan, communication plan, company introduction, company policy, competitor analysis, corporate responsibility update, customer deep dive, customer onboarding, customer pitch, employee performance review, financial performance, forecast update, go-to-market strategy, internal audit update, investor pitch, IT deep dive, journeyline, knowledge transfer, leadership meeting, leadership review, M&A proposal, managers meeting, market research findings, monthly review, new employee orientation, new market entry, operational deep dive, organizational updates, partner deep dive, portfolio review, pricing plan, product development plan, product launch plan, product performance review, project update, purchasing decisions, R&D findings, recruitment update, request for proposal, rewards and recognition, roadshow, salesforce contests, staff meeting, staffing update, steering committee meeting, strategy plan, tactical plan, team meeting, town hall, training collateral, webinar, or any other suitable presentation type.

In one example, the context parameters are provided to the context engine 107 from the client application 118. For example, as shown in FIG. 5, a drop down menu is provided such that the user can select a content type 506 for the content template. In other examples, a search function or other UI element may be provided for the user to select a content type 506. In some examples, the client application 118 is configured to provide the selected content type 506 to the context engine 107 as the at least one context parameter. In one example, the content types displayed to the user are provided by the UI engine 110. The context engine 107 may be configured to maintain and/or update the list of content types and provide a refreshed content type list to the UI engine 110. In some examples, users may upload or create their own custom content types. These custom content types may be stored in the application database 112a or the user database 112b. In some examples, the custom content types may be "private" and displayed only to one or more users (e.g., the creating user(s), users in the same organization, etc.). In some examples, the custom content types may be "public" and shared with all users once created.

At step 406, the outline engine 108 generates an outline (or storyline) for the content template. In one example, the outline engine 108 is configured to generate the storyline based on the at least one audience parameter and the at least one context parameter. For example, the fingerprint engine 106 may provide the at least one audience parameter and/or the corresponding user fingerprint(s) to the outline engine 108. Likewise, the context engine 107 may provide the at least one context parameter to the outline engine 108. In one example, the outline engine 108 generates a storyline that is optimized relative to the content type (e.g., all-hands meeting, brand plan, etc.) and the preferences of the target audience members (e.g., the fingerprints).

Figure 6:
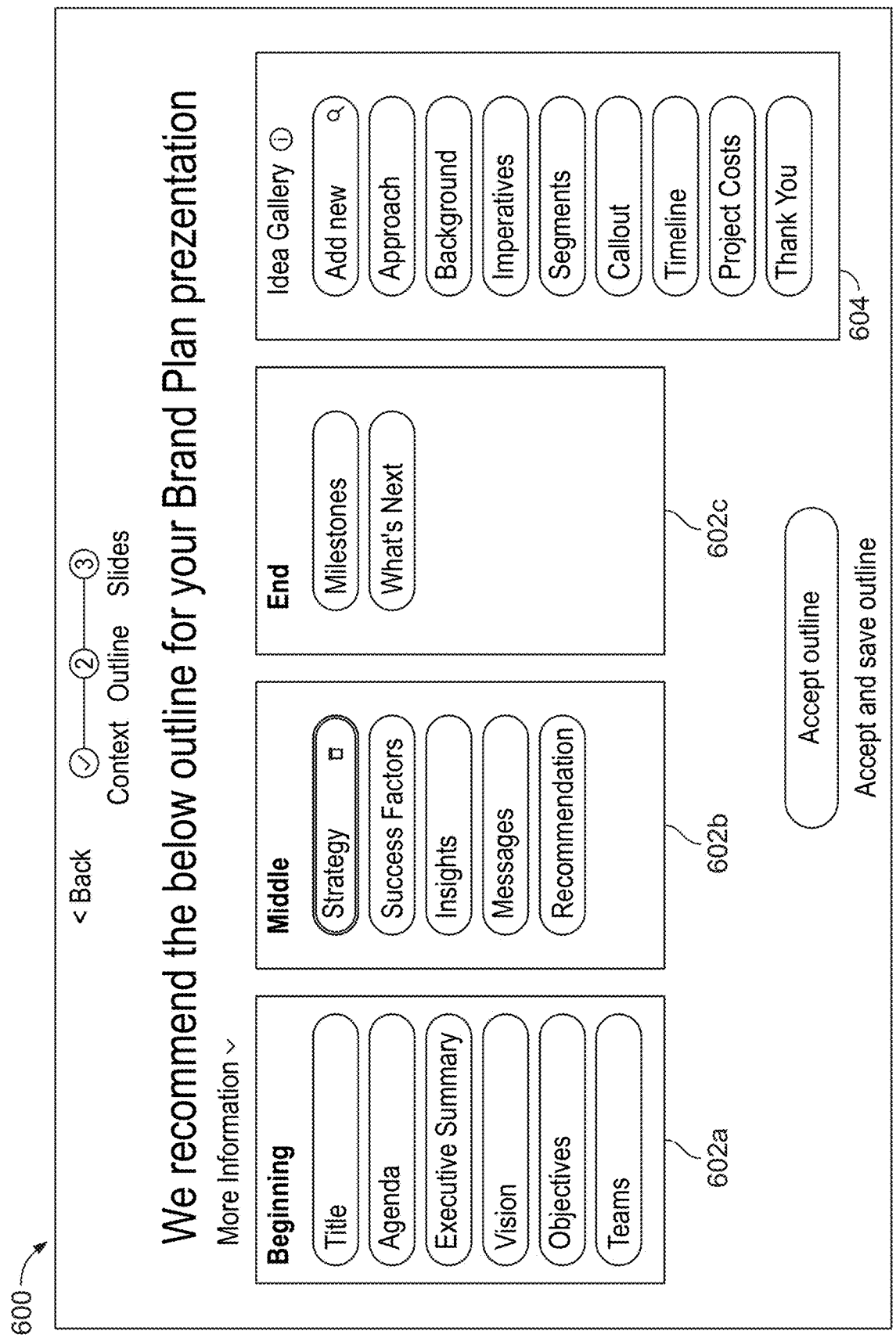
FIG. 6 illustrates a user interface of a client application in accordance with aspects described.

In some examples, the outline engine 108 is configured to generate a storyline including a plurality of sections. Each section of the plurality of sections may include one or more content items (e.g., slides). FIG. 6 illustrates a view 600 of the client application 118 for displaying a presentation storyline generated by the outline engine 108. In one example, the storyline includes a plurality of sections 602. For example, a first section 602a represents a "Beginning" of the presentation, a second section 602b represents a "Middle" of the presentation, and a third section 602c represents an "End" of the presentation. It should be appreciated that in other examples, the storyline can include more or less sections and/or different types of sections. As shown, each section 602 includes a set of slides. For example, the first section 602a includes a first set of slides (e.g., Title, Agenda, Executive Summary, Vision, Objectives, and Teams), the second section 602b includes a second set of slides (e.g., Strategy, Success Factors, Insights, Messages, Recommendation), and the third section 602c includes a third set of slides (e.g., Milestones, What's Next). In some examples, each section 602 includes a unique set of slides. In other words, each slide type (e.g., Insights, Messages, etc.) is only included in one of the sections. In other examples, each slide type can be used multiple times throughout the presentation. For example, the first and third sections 602a, 602c may each include an "Insights" slide.

In some examples, the user can modify the generated storyline. For example, the user may change the slide order within each section 602 to adjust the order generated by the outline engine 108. Likewise, the user can drag and drop slides to move slides between different sections. In some examples, the user can delete or remove slides added by the outline engine 108. In addition, the user may add slides that were not included in the storyline generated by the outline engine 108. For example, the user may drag and drop slides from an idea gallery 604. In some examples, the idea gallery 604 includes a search function that allows the user to search for new slides to add.

In some examples, rather than providing a storyline, the outline engine 108 may provide a list of slides based on the at least one audience parameter and the at least one context parameter. For example, when a "custom" content type is selected, the outline engine may provide a slide list that the user can then organize and/or modify the storyline on their own. In some examples, the user can save the storyline as a custom storyline.

At step 408, the style engine 109 selects (or creates) a style profile for the content template. In one example, the style engine 109 is configured to select (or create) the style profile based on the at least one audience parameter (e.g., user fingerprints), the at least one context parameter, and the content template storyline. For example, the user fingerprints can be used to determine the image preferences, color preferences, illustration preferences, presentation preferences for logical arguments, presentation preferences for data, and/or preferences for visualizing data for each audience member. As described above, the style profile incudes one or more stylistic attributes of the content template and/or the content. In one example, the style engine 109 is configured to select a pre-rendered style profile from a plurality of style profiles (e.g., a style profile library stored in the application database 112*a*). In some examples, the style engine 109 is configured to create a style profile including one or more of a template theme, a font theme, a color theme, and an organizational theme. In some examples, the style profile includes XML data that can be used to implement the corresponding style attributes in various content editing tools (e.g., Microsoft PowerPoint, Google Slides, etc.).

In some examples, a weighting system may be used when the target audience includes two or more individuals. For example, a weight (or ranking) may be assigned to each audience member. When two or more audience members have conflicting preferences, the weights (or ranks) of each member can be used to determine which preference is adopted by the content template (e.g., use preference of highest rank). In some examples, the weights (or ranks) are assigned by the user creating the content template. In other examples, the weights (or ranks) may be assigned by client application 118 or the application server 102. For example, a title (e.g., CEO, CFO, etc.) or description (e.g., Boss, Manager, etc.) associated with each audience member may be used to determine the weighting/ranking. Alternatively, conflicting preferences may be split across the target audience such that each member's preferences are equally represented in the content template.

At step 410, the user may change the at least one target audience parameter and/or the at least one context parameter. For example, the user may add members to the target audience and/or remove members from the target audience to change the at least one target audience parameter. In some examples, the fingerprint engine 106 may detect a change to the fingerprint of one or more audience members and update the at least one target audience parameter accordingly. Likewise, the user may modify the at least one context parameter by changing the context type. In one example, the changes to the at least one target audience parameter and/or the at least one context parameter are provided to the outline engine 108. The outline engine 108 is configured to dynamically update the storyline of the content template (step 406). In some examples, the style engine 109 is configured to dynamically modify the style profile for the content template based on the updated storyline, the changes to the at least one audience parameter, and/or the changes to the at least one context parameter (step 408).

At step 412, the content template is generated by the style engine 109. In some examples, the content template is generated by applying the style profile to the storyline generated by the outline engine 108. In one example, the style profile is applied by selecting one or more slides included in the storyline from a slide library with style attributes matching the style profile. In some examples, the style profile is applied by creating one or more slides included in the storyline with style attributes matching the style profile.

Figure 7:
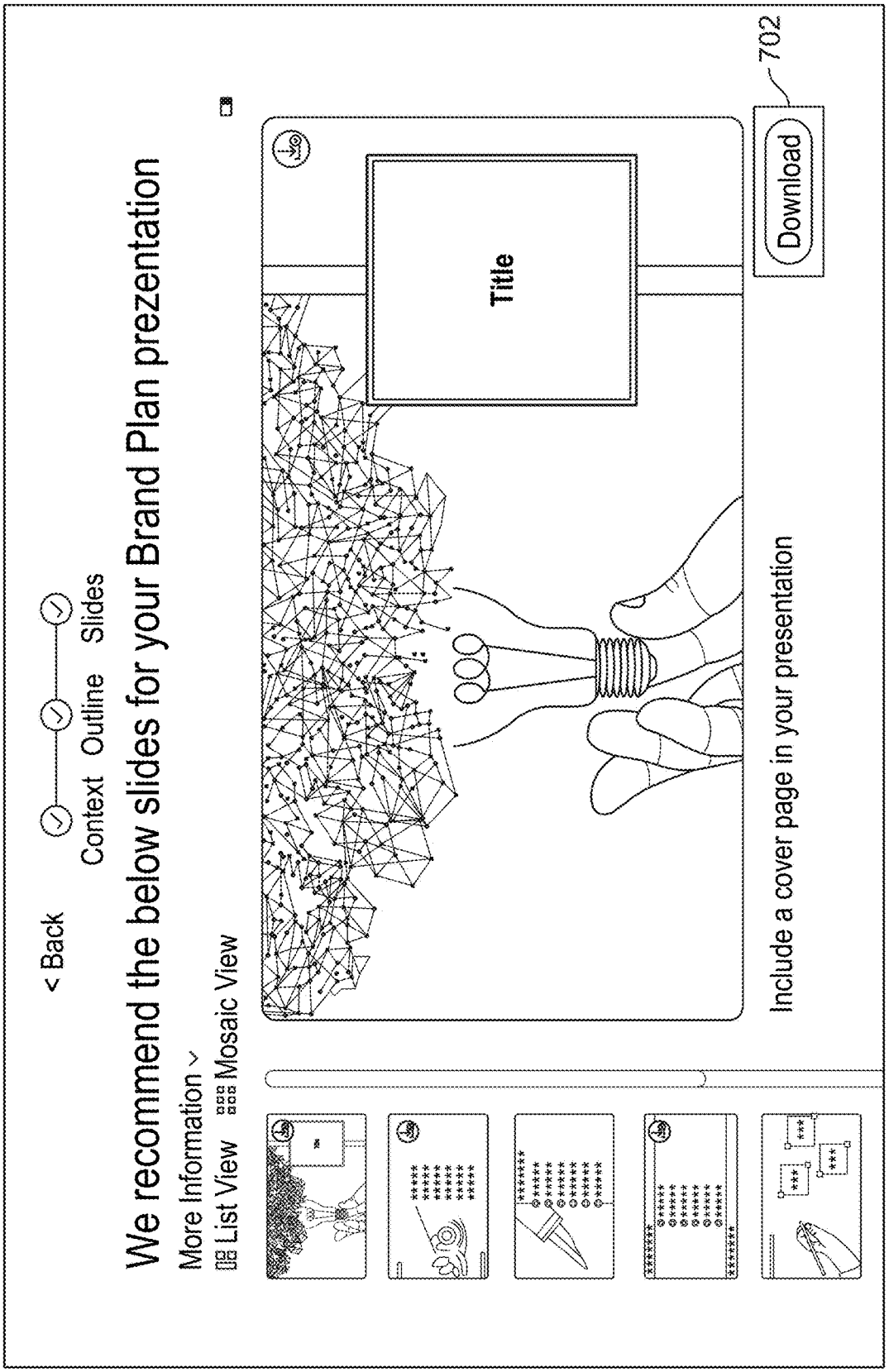
FIG. 7 illustrates a user interface of a client application in accordance with aspects described.

Once generated, the content template is presented to the user via the client application 118. FIG. 7 illustrates a view 700 of the client application 118 for displaying the content template. As shown, the user may view (or preview) the content template before downloading. In one example, the user can download the content template by selecting the download button 702. In some examples, after selecting the download button 702, the user is presented with a prompt to select a desired file format (or type) for the content template. For example, the UI engine 110 may provide an export service that allows the content template to be downloaded in various formats (e.g., PDF, Microsoft Word, Microsoft PowerPoint, etc.). In some examples, the content template can be directly imported to a content editing tool (e.g., Microsoft PowerPoint, Google Slides, etc.). As such, the user may utilize one or more content editing tools to "fill in" the content template with the corresponding content.

At step 414, the user may modify one or more features or characteristics of the content template. For example, the user may review the content template and decide to change the template's node count, layout, imagery, font, color, work area, shapes, charts, graphs, icons, text, brand, or any combination thereof. In some examples, the changes (or change requests) identified by the user are received via the client application 118 and directed to the corresponding engine of the application server 102 (e.g., the style engine 109). In one example, the style engine 109 is configured to auto-transform the content template based on the user's changes and modifications. In some examples, the style engine 109 is configured to apply the user's changes by dynamically generating a new content template (step 412).

Figure 8:
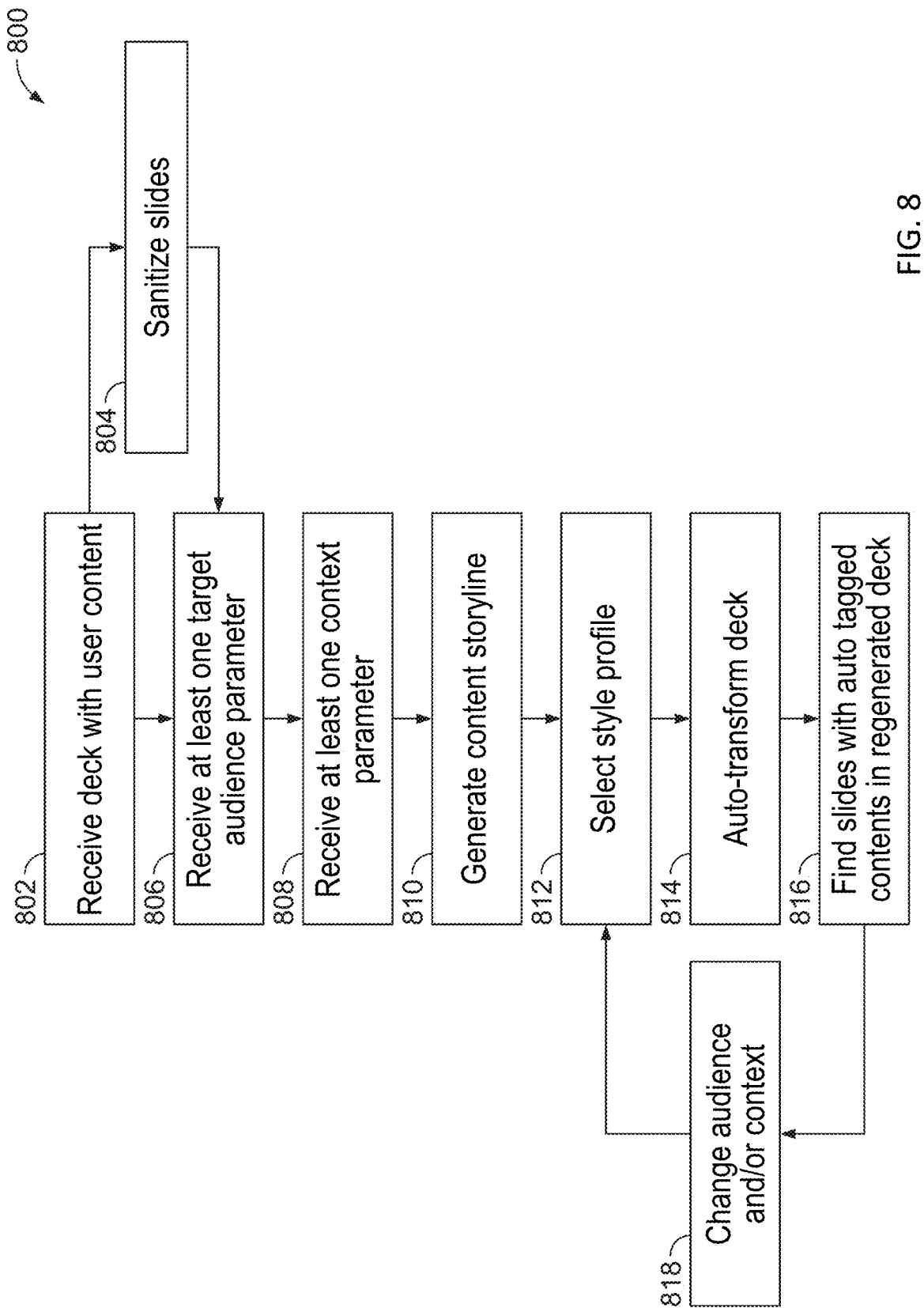
FIG. 8 illustrates a flow diagram of a method for transforming user-uploaded content.

As described above, the system 100 can use user-specific fingerprints to create content templates that are tailored to the target audience. In some examples, the system 100 may use user-specific fingerprints to transform existing content such that the content is tailored to the target audience. FIG. 8 is a flow diagram of a method 800 for transforming content in accordance with aspects described herein. In some examples, the method 800 corresponds to a process carried out by the application server 102 and the client application 118.

At step 802, the application server 102 receives a user-uploaded presentation. In one example, the presentation corresponds to a slide deck. In some examples, the presentation may be uploaded by the user via the client application 118. The various engines of the application server 102 may analyze the presentation to identify and classify content included in the presentation. For example, the outline engine 108 and/or the style engine 109 may deconstruct the presentation and analyze the content of the presentation. In some examples, the engines 108, 109 can include a topic model (e.g., an LDA model) to process and analyze the content of the presentation. In some examples, the engines 108, 109 are configured to process and analyze XML data associated with the content of the presentation. In some examples, the engines 108, 109 include a machine learning model configured to analyze and process the content of the presentation. In general, any suitable machine learning technique can be used, such as, for example: a gradient boosted random forest, a regression, a neural network, a decision tree, a support vector machine, a Bayesian network, other type of technique.

In one example, the content of the presentation is extracted from the presentation and stored in one or more content data structures (e.g., in the application database 112*a*). For example, the data from a chart included in the user-uploaded presentation may be extracted and saved as a content data structure having a content tag of "Chart". Likewise, the data (or content) from an executive summary included in the user-uploaded presentation may be extracted and saved as a data structure having a content tag of "Executive Summary", and so on. In some examples, the engines 108, 109 can add tags to the slides and/or objects of the user-uploaded presentation. In one example, the tags may indicate that the slides and/or objects include transformable content that will be tailored to the target audience. In some examples, the tags may provide a link (or location) to the corresponding content data structure saved in the application database 112*a*.

At step 804, the outline engine 108 and/or the style engine 109 may "sanitize" the user-uploaded presentation. In one example, the engines 108, 109 are configured to sanitize the presentation by removing any references to confidential, proprietary, private, and/or non-public information from the presentation (or the content of the presentation). In other words, the sanitization process may generalize the presentation. The level of sanitization provided may be adjusted by the user via the client application 118. In some examples, the user may be prompted to review the results of the sanitization process before proceeding with the content transformation.

At step 806, the fingerprint engine 106 receives at least one target audience parameter. In this context, the "target audience" corresponds to the intended or expected audience that the content is being tailored to. In one example, the at least one target audience parameter includes the names of members in the target audience. In some examples, the at least one target audience parameter includes the name of a group, team, club, organization, company, or another type of group including one or more individuals. In some examples, the at least one target audience parameter includes at least one fingerprint type (e.g., Architect, Surgeon, etc.). In some examples the fingerprint engine 106 is configured to access, retrieve, or download the corresponding user fingerprints from the application database 112*a*. In one example, the target audience parameters are provided to the fingerprint engine 106 from the client application 118. The client application 118 may be configured to collect the various parameters from the user(s) transforming the content.

At step 808, the context engine 107 receives at least one context parameter. In one example, "context" corresponds to the intended type, purpose, and/or objective of the content. In some examples, the "context" of the content corresponds to the tone of the content (e.g., good news, bad news, etc.). In one example, the at least one context parameter includes a content type. In some examples, the context parameters are provided to the context engine 107 from the client application 118. In other examples, the context engine 107 may be configured to derive the context type from the user-uploaded presentation (or the included content).

At step 810, the outline engine 108 generates an outline (or storyline) for the content. In one example, the outline engine 108 is configured to generate the storyline based on the at least one audience parameter and the at least one context parameter. For example, the fingerprint engine 106 may provide the at least one audience parameter and/or the corresponding user fingerprint(s) to the outline engine 108. Likewise, the context engine 107 may provide the at least one context parameter to the outline engine 108. In one example, the outline engine 108 generates a storyline that is optimized relative to the content type (e.g., all-hands meeting, brand plan, etc.) and the preferences of the target audience members (e.g., the fingerprints). In some examples, the outline engine 108 is configured to generate a storyline including a plurality of sections. Each section of the plurality of sections may include one or more content items (e.g., slides). In some examples, rather than providing a storyline, the outline engine 108 may provide a list of slides based on the at least one audience parameter and the at least one context parameter. For example, when a "custom" content type is selected, the outline engine may provide a slide list that the user can then organize and/or modify the storyline on their own. In some examples, the user can save the storyline as a custom storyline.

At step 812, the style engine 109 selects (or creates) a style profile for the content. In one example, the style engine 109 is configured to select (or create) the style profile based on the at least one audience parameter (e.g., user fingerprints), the at least one context parameter, and the content storyline. For example, the user fingerprints can be used to determine the image preferences, color preferences, illustration preferences, presentation preferences for logical arguments, presentation preferences for data, and/or preferences for visualizing data for each audience member. As described above, the style profile incudes one or more stylistic attributes of the content. In one example, the style engine 109 is configured to select a pre-rendered style profile from a plurality of style profiles (e.g., a style profile library stored in the application database 112*a*). In some examples, the style engine 109 is configured to create a style profile including one or more of a template theme, a font theme, a color theme, and an organizational theme. In some examples, the style profile includes XML data that can be used to implement the corresponding style attributes in various content editing tools (e.g., Microsoft PowerPoint, Google Slides, etc.).

In some examples, a weighting system may be used when the target audience includes two or more individuals. For example, a weight (or ranking) may be assigned to each audience member. When two or more audience members have conflicting preferences, the weights (or ranks) of each member can be used to determine which preference is adopted by the content (e.g., use preference of highest rank). In some examples, the weights (or ranks) are assigned by the user transforming the content. In other examples, the weights (or ranks) may be assigned by client application 118 or the application server 102. For example, a title (e.g., CEO, CFO, etc.) or description (e.g., Boss, Manager, etc.) associated with each audience member may be used to determine the weighting/ranking. Alternatively, conflicting preferences may be split across the target audience such that each member's preferences are equally represented in the content.

At step 814, the content is auto-transformed by the style engine 109. In some examples, the content is transformed by applying the style profile to the storyline generated by the outline engine 108. In one example, the style profile is applied by selecting one or more slides included in the storyline from a slide library with style attributes matching the style profile. In some examples, the style profile is applied by creating one or more slides included in the storyline with style attributes matching the style profile. The style engine 109 is configured to access the tagged content data stored in the application database 112*a* and integrate the content data into the presentation based on the content storyline and the style profile.

At step 816, the transformed presentation is analyzed to find the slides and/or objects corresponding to the tagged content data. In one example, the tagged content data is updated (e.g., in the application database 112*a*) based on the representation of the content in the transformed presentation. In some examples, the tagged content data is saved and used to generate subsequent presentations (e.g., tailored to a plurality of target audiences). In certain examples, the tagged content data is used to generate different forms of content. For example, the tagged content data from a presentation may be used to generate a memo, email, etc.

At step 818, the user may change the at least one target audience parameter and/or the at least one context parameter. For example, the user may add members to the target audience and/or remove members from the target audience to change the at least one target parameter. In some examples, the fingerprint engine 106 may detect a change to the fingerprint of one or more audience members and may update the at least one target audience parameter accordingly. Likewise, the user may modify the at least one context parameter by changing the context type. In one example, the changes to the at least one target audience parameter and/or the at least one context parameter are provided to the outline engine 108. The outline engine 108 is configured to dynamically update the storyline of the content (step 810). In some examples, the style engine 109 is configured to dynamically modify the style profile for the content based on the updated storyline, the changes to the at least one audience parameter, and/or the changes to the at least one context parameter (step 812).

Once generated, the content is presented to the user via the client application 118. In some examples, the UI engine 110 may provide an export service that allows the content to be downloaded in various formats (e.g., PDF, Microsoft Word, Microsoft PowerPoint, etc.). In some examples, the content can be directly imported to a content editing tool (e.g., Microsoft PowerPoint, Google Slides, etc.).

Figure 9:
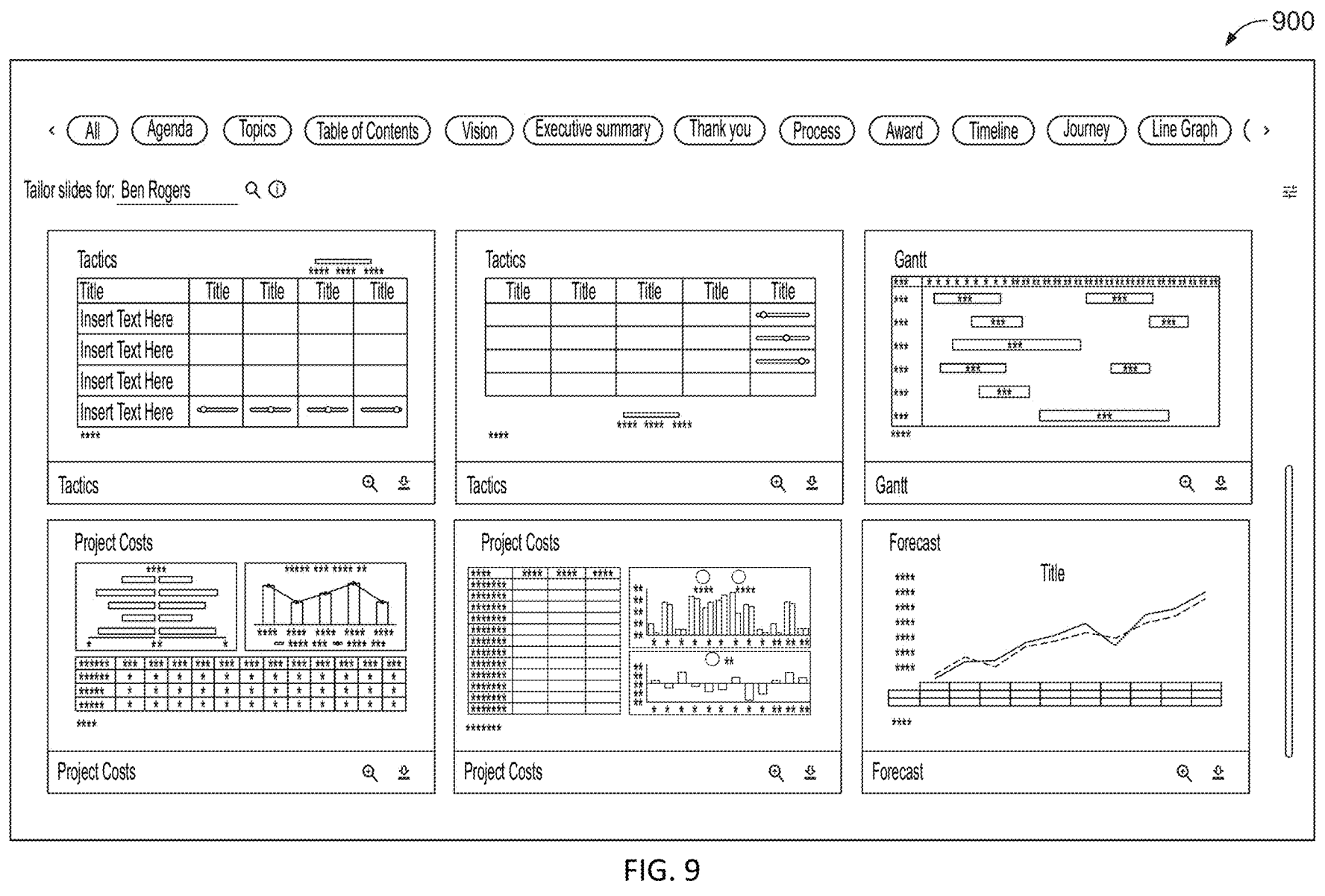

FIG. 9 illustrates a slide library 900 in accordance with aspects described herein. In one example, the user can access the slide library 900 by selecting the slides button 206 of FIG. 2. The slide library 900 may be stored in the application database 112a and managed by the engines 106-110 of the application server 102. In some examples, the user may access the slide library 900 to preview slides corresponding to different user fingerprint, context types, and style profiles. In certain examples, the user may use the interface to assist in selecting the appropriate context type when creating a new content template. In some examples, the user may use the interface to check the slides associated with their own fingerprint.

Figure 10:
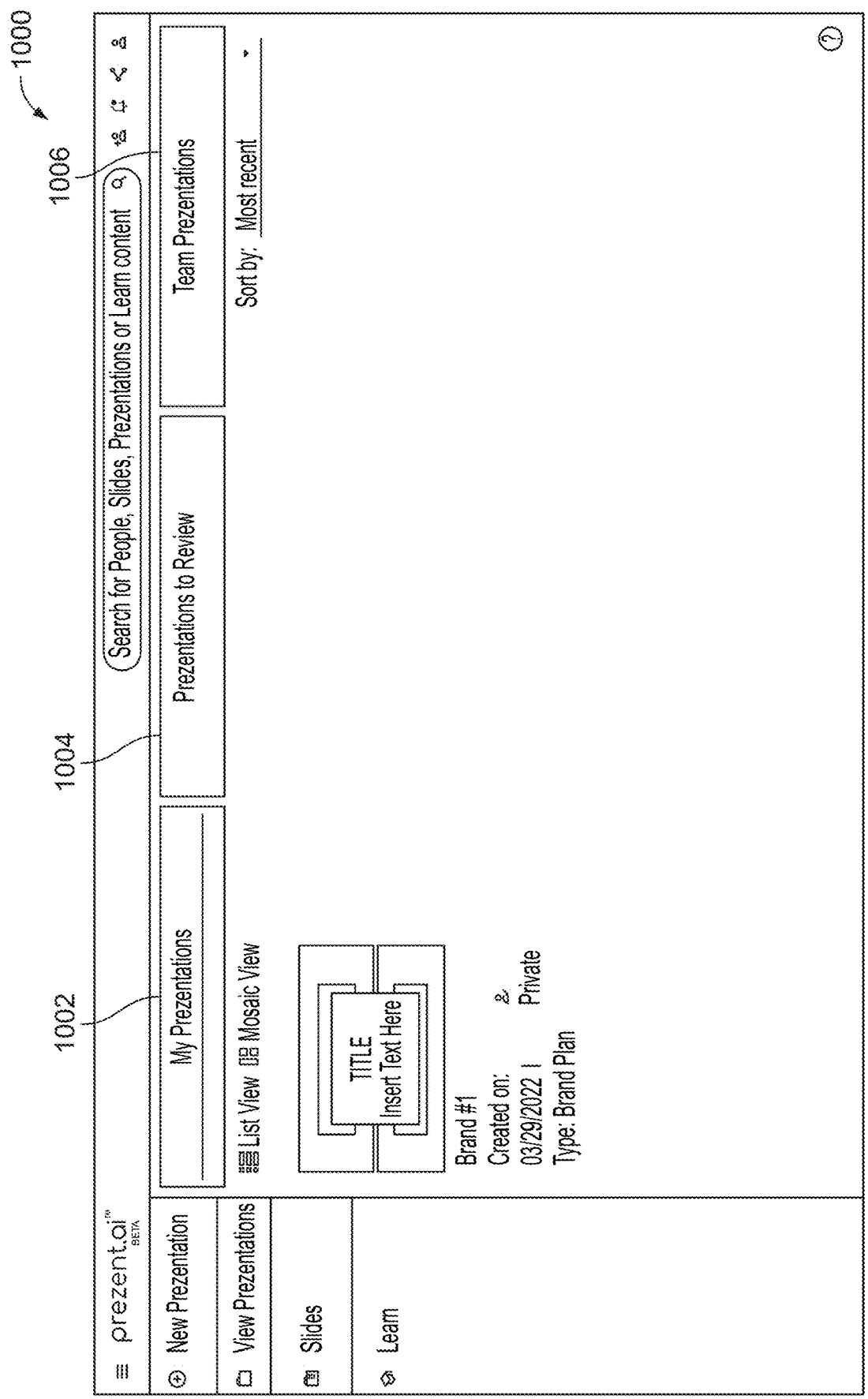
FIG. 10 illustrates a template management interface in accordance with aspects described.

FIG. 10 illustrates a template management interface 1000 of the client application 118. In one example, the user can access the template management interface 1000 by selecting the presentation button 204 of FIG. 2. The contents of the template management interface 1000 may be stored in the application database 112a and/or the user database 112b and managed by the UI engine 110 of the application server 102. In some examples, the user may use the interface 1000 to view content templates they have created (e.g., via tab 1002). Likewise, the user may use the interface 1000 to view content templates that have been assigned to them for review (e.g., via tab 1004). In some examples, the user may use the interface 1000 to view content templates they have created or are creating in collaboration with other users (e.g., via tab 1006).

While the examples above describe the creation of content templates for presentations (e.g., slideshows), it should be appreciated that the system 100 can be adapted for other types of content. For example, the system 100 can be configured to generate templates for emails, memos, spreadsheets, reports, letters, or any other type of content or media. As such, the system 100 can generate content templates that are compatible with various content editing tools and platforms, such as, for example: Microsoft PowerPoint, Microsoft Office, Microsoft Excel, Google Slides, Microsoft Outlook, Gmail, Adobe Acrobat, etc.

As described above, systems and methods for creating content templates based on audience preferences and contextual factors are provided herein. In at least one embodiment, a content storyline is generated based on parameters of the target audience and the context of the content. In one example, the parameters of the target audience correspond to a preference fingerprint of the audience member(s). In some examples, a style profile is selected or created for the content template based on the parameters of the target audience, the context of the content, and the storyline.

Hardware and Software Implementations

Figure 11:
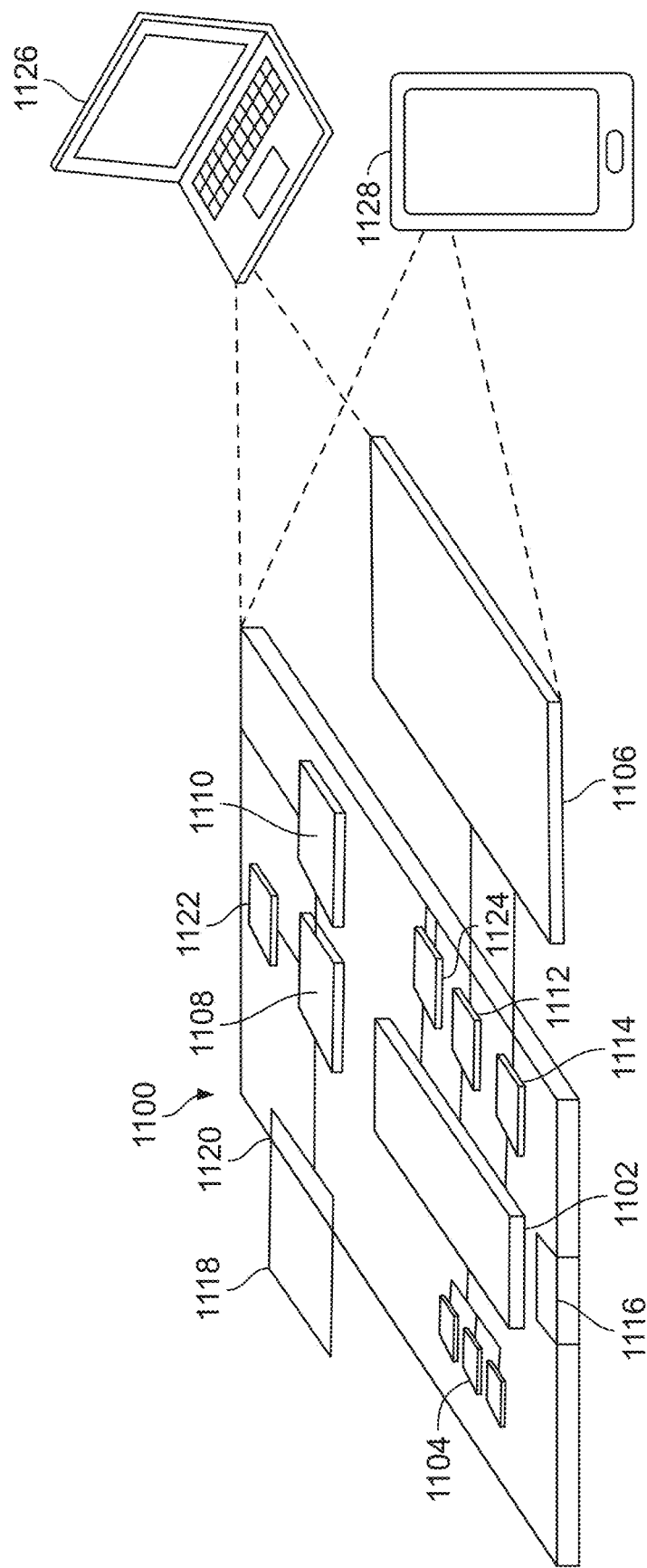
FIG. 11 illustrates an example computing device.

FIG. 11 shows an example of a generic computing device 1100, which may be used with some of the techniques described in this disclosure (e.g., as user device 116 or application server 102). Computing device 1100 includes a processor 1102, memory 1104, an input/output device such as a display 1106, a communication interface 1108, and a transceiver 1110, among other components. The device 1100 may also be provided with a storage device, such as a micro-drive or other device, to provide additional storage. Each of the components 1100, 1102, 1104, 1106, 1108, and 1110, are interconnected using various buses, and several of the components may be mounted on a common motherboard or in other manners as appropriate.

The processor 1102 can execute instructions within the computing device 1100, including instructions stored in the memory 1104. The processor 1102 may be implemented as a chipset of chips that include separate and multiple analog and digital processors. The processor 1102 may provide, for example, for coordination of the other components of the device 1100, such as control of user interfaces, applications run by device 1100, and wireless communication by device 1100.

Processor 1102 may communicate with a user through control interface 1112 and display interface 1114 coupled to a display 1106. The display 1106 may be, for example, a TFT LCD (Thin-Film-Transistor Liquid Crystal Display) or an OLED (Organic Light Emitting Diode) display, or other appropriate display technology. The display interface 1114 may comprise appropriate circuitry for driving the display 1106 to present graphical and other information to a user. The control interface 1112 may receive commands from a user and convert them for submission to the processor 1102. In addition, an external interface 1116 may be provided in communication with processor 1102, so as to enable near area communication of device 1100 with other devices. External interface 1116 may provide, for example, for wired communication in some implementations, or for wireless communication in other implementations, and multiple interfaces may also be used.

The memory 1104 stores information within the computing device 1100. The memory 1104 can be implemented as one or more of a computer-readable medium or media, a volatile memory unit or units, or a non-volatile memory unit or units. Expansion memory 1118 may also be provided and connected to device 1100 through expansion interface 1120, which may include, for example, a SIMM (Single In Line Memory Module) card interface. Such expansion memory 1118 may provide extra storage space for device 1100, or may also store applications or other information for device 1100. Specifically, expansion memory 1118 may include instructions to carry out or supplement the processes described above, and may include secure information also. Thus, for example, expansion memory 1118 may be provided as a security module for device 1100, and may be programmed with instructions that permit secure use of device 1100. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1104, expansion memory 1118, memory on processor 1102, or a propagated signal that may be received, for example, over transceiver 1110 or external interface 1116.

Device 1100 may communicate wirelessly through communication interface 1108, which may include digital signal processing circuitry where necessary. Communication interface 1108 may in some cases be a cellular modem. Communication interface 1108 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1110. In addition, short-range communication may occur, such as using a Bluetooth, WiFi, or other such transceiver (not shown). In addition, GPS (Global Positioning System) receiver module 1122 may provide additional navigation- and location-related wireless data to device 1100, which may be used as appropriate by applications running on device 1100.

Device 1100 may also communicate audibly using audio codec 1124, which may receive spoken information from a user and convert it to usable digital information. Audio codec 1124 may likewise generate audible sound for a user, such as through a speaker, e.g., in a handset of device 1100. Such sound may include sound from voice telephone calls, may include recorded sound (e.g., voice messages, music files, etc.) and may also include sound generated by applications operating on device 1100. In some examples, the device 1100 includes a microphone to collect audio (e.g., speech) from a user. Likewise, the device 1100 may include an input to receive a connection from an external microphone.

The computing device 1100 may be implemented in a number of different forms, as shown in FIG. 11. For example, it may be implemented as a computer (e.g., laptop) 1126. It may also be implemented as part of a smartphone 1128, smart watch, tablet, personal digital assistant, or other similar mobile device.

Some implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for creating a personalized content, comprising:
    presenting at least one preference inquiry to an audience member;
    deriving, based on a response to the at least one preference injury, at least one preference of the audience member when receiving content;
    generating a preference fingerprint for the audience member based on the at least one preference of the audience member;
    receiving a request for content to be delivered to a target audience, the target audience including the audience member;
    receiving at least one context parameter representing a context of the content to be delivered to the target audience;
    obtaining at least one audience parameter representing at least one preference of the target audience when receiving the content, the at least one audience parameter corresponding, at least in part, to the preference fingerprint of the audience member;

determining a content storyline based on the at least one audience parameter and the at least one context parameter; and generating the content based on the content storyline.

2. The method of claim 1, wherein generating the content based on the content storyline includes:
   (i) generating a content template based on the content storyline; and
   (ii) populating the content template with content information.

3. The method of claim 2, wherein the content information includes text, images, data, or any combination thereof.

4. The method of claim 2, further comprising:
   receiving existing, non-personalized content; and
   extracting at least a portion of the content information from the non-personalized content.

5. The method of claim 4, further comprising:
   presenting a recommendation of one or more content storylines options based on the non-personalized content, the at least one audience parameter, and the at least one context parameter.

6. The method of claim 4, further comprising:
   presenting a recommendation of one or more style profile options based on the non-personalized content, the at least one audience parameter, and the at least one context parameter.

7. The method of claim 2, further comprising:
   retrieving at least a portion of the content information from one or more databases.

8. The method of claim 1, wherein the target audience is a single individual.

9. The method of claim 1, wherein the target audience is two or more individuals.

10. The method of claim 1, wherein the at least one audience parameter represents one or more of image preferences, color preferences, illustration preferences, presentation preferences for logical arguments, presentation preferences for data, and preferences for visualizing data of the target audience.

11. The method of claim 1, wherein the preference fingerprint includes the at least one audience parameter.

12. The method of claim 1, wherein the at least one context parameter corresponds to one or more of a type, purpose, and objective of the content.

13. The method of claim 1, wherein the content storyline corresponds to one or more of a sequence, order, and flow of the content.

14. The method of claim 1, further comprising:
   selecting a style profile based on the at least one audience parameter and the at least one context parameter.

15. The method of claim 14, wherein generating the content includes generating the content based on the content storyline and the style profile.

16. The method of claim 14, wherein the style profile corresponds to one or more of a content theme, a font theme, a color theme, and an organizational theme of the content.

17. The method of claim 1, further comprising:
   selecting a style profile based on an organization associated with the audience member.

18. The method of claim 17, further comprising:
   receiving existing, non-personalized content; and
   generating the content by applying the style profile to the non-personalized content.

19. The method of claim 1, further comprising:
   exporting the content to at least one content editing application.

20. The method of claim 1, wherein determining the content storyline includes (i) selecting a plurality of content elements and (ii) arranging the selected plurality of content elements in a sequence.

21. The method of claim 1, wherein the request for the content includes the at least one context parameter.

22. A system for creating personalized content, comprising:
   at least one memory for storing computer-executable instructions; and
   at least one processor for executing the instructions stored on the memory, wherein execution of the instructions programs the at least one processor to perform operations comprising:
      presenting at least one preference inquiry to an audience member;
      deriving, based on a response to the at least one preference injury, at least one preference of the audience member when receiving content;
      generating a preference fingerprint for the audience member based on the at least one preference of the audience member;
      receiving a request for a content to be delivered to a target audience, the target audience including the audience member;
      receiving at least one context parameter representing a context of the content to be delivered to the target audience;
      obtaining at least one audience parameter representing at least one preference of the target audience when receiving the content, the at least one audience parameter corresponding, at least in part, to the preference fingerprint of the audience member;
      determining a content storyline based on the at least one audience parameter and the at least one context parameter; and
      generating the content based on the content storyline.

23. The system of claim 22, wherein generating the content based on the content storyline includes:
   (i) generating a content template based on the content storyline; and
   (ii) populating the content template with content information.

24. The system of claim 23, wherein the content information includes text, images, data, or any combination thereof.

25. The system of claim 23, wherein execution of the instructions programs the at least one processor to perform operations further comprising:
   receiving existing, non-personalized content; and
   extracting at least a portion of the content information from the non-personalized content.

26. The system of claim 25, wherein execution of the instructions programs the at least one processor to perform operations further comprising:
   presenting a recommendation of one or more content storylines options based on the non-personalized content, the at least one audience parameter, and the at least one context parameter.

27. The system of claim 25, wherein execution of the instructions programs the at least one processor to perform operations further comprising:
   presenting a recommendation of one or more style profile options based on the non-personalized content, the at least one audience parameter, and the at least one context parameter.

28. The system of claim 23, wherein execution of the instructions programs the at least one processor to perform operations further comprising:
   retrieving at least a portion of the content information from one or more databases.

29. The system of claim 22, wherein the target audience is a single individual.

30. The system of claim 22, wherein the target audience is two or more individuals.

31. The system of claim 22, wherein the at least one audience parameter represents one or more of image preferences, color preferences, illustration preferences, presentation preferences for logical arguments, presentation preferences for data, and preferences for visualizing data of the target audience.

32. The system of claim 22, wherein the preference fingerprint includes the at least one audience parameter.

33. The system of claim 22, wherein the at least one context parameter corresponds to one or more of a type, purpose, and objective of the content.

34. The system of claim 22, wherein the content storyline corresponds to one or more of a sequence, order, and flow of the content.

35. The system of claim 22, wherein execution of the instructions programs the at least one processor to perform operations further comprising:
   selecting a style profile based on the at least one audience parameter and the at least one context parameter.

36. The system of claim 35, wherein generating the content includes generating the content based on the content storyline and the style profile.

37. The system of claim 35, wherein the style profile corresponds to one or more of a content theme, a font theme, a color theme, and an organizational theme of the content.

38. The system of claim 22, wherein execution of the instructions programs the at least one processor to perform operations further comprising:
   selecting a style profile based on an organization associated with the audience member.

39. The system of claim 38, wherein execution of the instructions programs the at least one processor to perform operations further comprising:
   receiving existing, non-personalized content; and
   generating the content by applying the style profile to the non-personalized content.

40. The system of claim 22, wherein execution of the instructions programs the at least one processor to perform operations further comprising:
   exporting the content to at least one content editing application.

41. The system of claim 22, wherein determining the content storyline includes (i) selecting a plurality of content elements and (ii) arranging the selected plurality of content elements in a sequence.

42. The system of claim 22, wherein the request for the content includes the at least one context parameter.

\* \* \* \* \*